Aug. 7, 1956     J. R. McVEIGH     2,757,901
COMPOSITE TURBINE DISC
Filed Feb. 24, 1953
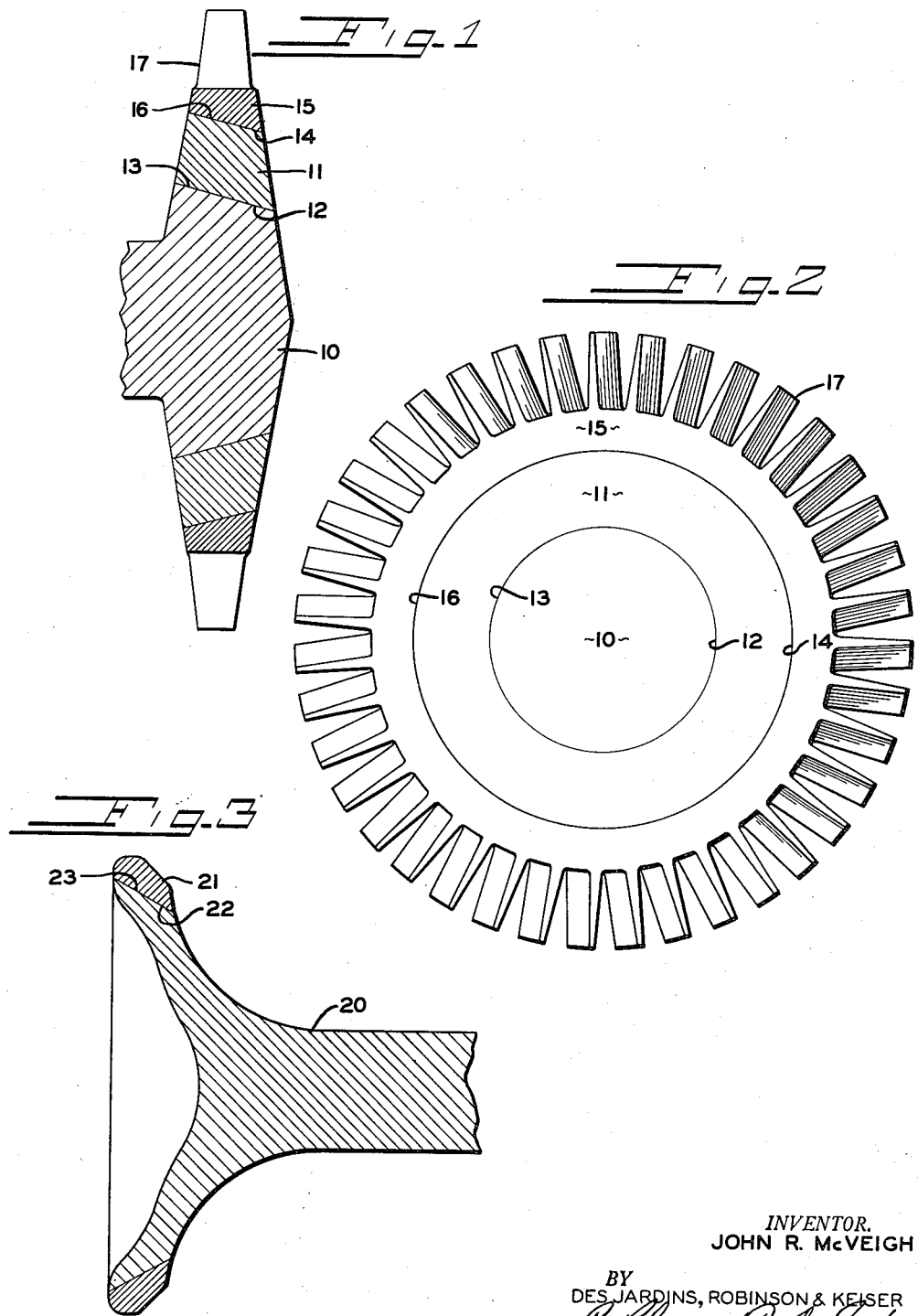
INVENTOR.
JOHN R. McVEIGH
BY
DES JARDINS, ROBINSON & KEISER
HIS ATTORNEYS

United States Patent Office 2,757,901
Patented Aug. 7, 1956

2,757,901
COMPOSITE TURBINE DISC

John R. McVeigh, Latrobe, Pa., assignor to Kennametal Inc., Latrobe, Pa., a corporation of Pennsylvania Application February 24, 1953, Serial No. 338,361

1 Claim. (Cl. 253—77)

My invention relates to improvements in composite structures, and has to do, more particularly, with a composite structure including a plurality of metallic sections of differing physical characteristics, and the process of making such a composite structure.

The principal object of my invention is to provide a composite metallic structure, which is strong, but has different physical characteristics in different portions of the structure.

A further object of my invention is to provide a composite structure having an outer portion of greater hardness and less ductility than a central portion of the structure.

A further object of my invention is to provide a strong and homogeneously united composite structure, having two sections, both of cemented hard carbide composition, the one section having greater hardness and less ductility than the other section.

Another object of my invention is to provide a composite turbine wheel construction having a central section of alloy steel, an intermediate section of cemented hard carbide composition of greater hardness and less ductility than the central section, and an outer section of cemented hard carbide composition of greater hardness and less ductility than the intermediate section, said sections being welded together to produce a strong composite structure having the desired physical characteristics in selected portions of the structure.

Further objects, and objects relating to details and economies of the structure and the method of making the same, will definitely appear from the detailed description to follow. In two instances, I have accomplished the objects of my invention by the devices and means described in the following specification. My invention is clearly defined and pointed out in the appended claim.

In the accompanying drawings,

Fig. 1 is a vertical sectional view through a composite turbine wheel embodying my invention.

Fig. 2 is a view in plan of said turbine wheel and

Fig. 3 is a sectional view through a valve member constituting another embodiment of my invention.

In general, my invention comprises a composite structure made up of a plurality of sections of differing physical characteristics. Each section has a frusto-conical surface that mates with a frusto-conical surface of an adjacent section, and said sections are autogeneously welded at the mating surfaces. The sections may differ, for example, in hardness and ductility, and it may also be desirable to form the sections of materials having different coefficients of thermal expansion, or different densities. The sections of the composite structure, or some of them, may conveniently be formed of a cemented hard carbide composition, the ingredients of which, and the proportions of ingredients, are selected to give the desired density, hardness, ductility and coefficient of thermal expansion. The composite structure, suitable for use as a turbine disc, or wheel may have a central section of alloy steel, an intermediate section of cemented hard carbide composition of greater hardness, less ductility, less density and lower coefficient of thermal expansion than the central section, and an outer section, also of cemented hard carbide composition, of greater hardness, less ductility, less density and lower coefficient of thermal expansion than the intermediate section. The central and outer sections have greater resistance to deformation at high temperatures than the inner section.

The method forming part of my invention comprises the steps of forming an inner metallic section with certain physical characteristics, on which inner section an external frusto-conical surface is provided, forming an outer metallic section of different physical characteristics, on which outer section an internal frusto-conical surface is formed of the same slope as that of the inner section, assembling the sections with the frusto-conical surfaces in mating engagement and heating the assembled sections to a temperature sufficient to weld them autogenously at the mating frusto-conical surfaces.

In Fig. 1 and 2, I have shown a composite gas turbine wheel or disc constituting one embodiment of my invention. It is highly desirable, in such a gas turbine wheel, to use material that is more ductile at the locations where the stresses are highest, which is usually near the center of the wheel. On the other hand, it is desirable to provide at the periphery of the wheel, where the turbine blades are located, material which, while less ductile, is harder, more resistant to deformation at high temperatures and more highly resistant to corrosion and oxidation at high temperatures. Furthermore, since the center of the wheel operates at a lower temperature than the periphery thereof, thermal stresses may be reduced by using as the material of the center portion a metal having a higher coefficient of thermal expansion than the peripheral portion or portions of the wheel. However, these various portions of the wheel, although having different physical characteristics, must be strongly united and bonded together so as to make a structure which, although composite, is strong at all places including the joints between sections.

The gas turbine wheel shown in Figs. 1 and 2, includes a central section 10, which may be forged on the end of the shaft or may be attached to a shaft by suitable connections. This central section is preferably formed of an alloy steel. One material that is suitable for this purpose is the alloy steel known under the trade-name "Timken 16–25–6," which has a high ductility as indicated by an elongation of 24% at room temperature, which increases to an elongation of 59% at 1700° F. This alloy steel has a coefficient of thermal expansion, over the range from 70° to 1000° F. of $9.36 \times 10^{-6}$ per ° F., or, over the range from 70° to 1500° F., of $9.67 \times 10^{-6}$. Another example of a suitable alloy for use in making the central section is that known under the trade name of "Discalloy," which has an elongation at room temperature of 19.9% and a coefficient of thermal expansion in the range from 70° to 1000° F. of $9.5 \times 10^{-6}$. Whatever the material used to form the central section, a ground frusto-conical surface 12 is formed externally thereon.

The intermediate section 11 of the turbine wheel is preferably a cemented hard carbide composition. One material which is suitable for forming this intermediate section is a sintered hard carbide composition containing a binder of about 40% nickel, the balance of the composition being titanium carbide with a minor proportion of columbium carbide and/or tantalum carbide. This composition has a density of 6.3 grams per cubic centimeter and a hardness of 82.8 on the Rockwell A scale, a modulus of rupture of 185,000 p. s. i., a modulus of elasticity of 41,000,000 p. s. i., a coefficient of thermal expansion of $5.8 \times 10^{-6}$ in./in./° F., and a tensile strength of 111,000 p. s. i. Its ductility is low, as indicated by an elongation at room temperature of .26%. Another material, suitable for use in making the intermediate section of the turbine wheel, is a sintered hard carbide composition having a binder content of about 50% nickel, the remainder being largely titanium carbide with a minor portion of columbium carbide and/or tantalum carbide. This material has a density of 6.44 grams per cc., a hardness on the Rockwell A scale of 80.9, a modulus of rupture of 235,000 p. s. i., a modulus of elasticity of 41,000,000 p. s. i. and a coefficient of thermal expansion of $6.2 \times 10^{-6}$ in./in./° F. This material has a tensile strength of 115,000 p. s. i. and an elongation at room temperature of .28%. This intermediate section is formed, according to the principles of powder metallurgy, of the material selected, such as one of the examples given above, with an internal frusto-conical surface 13 and an external frusto-conical surface 14, and the section is then given a final sintering. After sintering, the internal frusto-conical surface 13 is ground to the same slope as the external frusto-conical surface 12 of the central section. The external frusto-conical surface 14 of the intermediate section 11 is also ground to a smooth surface without irregularity.

The outer section 15 of the turbine wheel is likewise formed of a sintered hard carbide composition, but this composition is so selected as to have a greater hardness, less ductility, superior resistance to deformation at high temperatures, less density and a lower coefficient of thermal expansion than the intermediate section 11, which intermediate section, as previously stated, has been formed of such material that it has a greater hardness, less ductility and lower coefficient of thermal expansion than the central section. A suitable sintered hard carbide composition for forming the outer section is one having a binder consisting of about 30% nickel, the remainder of the composition being largely titanium carbide with a minor proportion of columbium carbide and/or tantalum carbide. This composition has a density of 6.0 grams per cc., a hardness on the Rockwell A scale of 85.0, a modulus of rupture of 210,000 p. s. i., a modulus of elasticity of 47,000,000 p. s. i., and a coefficient of thermal expansion of $5.3 \times 10^{-6}$ in./in./° F. It has a tensile strength of 100,000 p. s. i. and low ductility as indicated by an elongation in a tensile test at room temperature of .25%. This outer section 15 is made in accordance with the principles of powder metallurgy and preferably formed with turbine blades 17 on the outer periphery thereof, and with an internal frusto-conical surface 16. After the piece has been subjected to final sintering, the internal frusto-conical surface 16 is ground to precisely the slope of the external frusto-conical surface 14 on the intermediate section.

After the three sections have been formed as described above, and the frusto-conical surfaces ground thereon, the sections are assembled with the internal frusto-conical surface 13 of the intermediate section fitting on, and in mating engagement with the external frusto-conical surface 12 of the central section, and with the internal frusto-conical surface 16 of the outer section fitting on, and in mating engagement with, the external frusto-conical surface 14 of the intermediate section. The assembled sections are then heated to a temperature within the range of 2,000° to 3,000° F. and held at that temperature for a sufficient length of time to cause the autogenous welding of the sections at the mating frusto-conical surfaces. In some cases, the application of pressure, to hold the mating surfaces in close contact, may be of advantage in making a good bond between them. A good strong bond between the sections may be promoted by inserting a nickel metal shim of about .005 inch thickness between the mating frusto-conical surfaces and, then, raising the assembled section to the proper welding temperature, which should be such as to cause the nickel of the shim to diffuse into the materials on either side of the joint. This increases the nickel content in the materials on either side of the joint, but to so limited an extent as to have no deleterious effect. Instead of such a nickel shim, the frusto-conical surfaces may be coated with a suspension of nickel or may be nickel plated to the desired thickness. Cobalt and iron are equivalents of nickel, for this purpose, and may be substituted in whole or in part for the nickel shim, coating or plating. They are also equivalents of nickel and may be substituted, in whole or in part, therefor as the binder metal of the hard carbide composition. Since the nickel diffuses into the material on either side of the joint, I do not consider it as a weld with added metal and, therefore, I have used the term "autogenous welding" in a sense broad enough to include the welding described above with the interposition of a thin coating or layer of nickel or its equivalent.

In Fig. 3, I have illustrated another composite structure made in accordance with my invention. This is a valve member, which is to be provided with a peripheral valve-seat-engaging portion that is harder than the body of the valve member. The main body portion 20 of this valve member is preferably formed of a sintered hard carbide composition having a binder content of nickel constituting about 50% of the composition, the remainder of the composition being titanium carbide with a minor proportion of columbium carbide and/or tantalum carbide. This composition has a density of 6.44 grams per cc., a hardness on the Rockwell A scale of 80.9, a modulus of rupture of 235,000 p. s. i., a modulus of elasticity of 41,000,000 p. s. i., and a coefficient of thermal expansion of $6.2 \times 10^{-6}$ in./in./° F. It has a tensile strength of 115,000 p. s. i. This body member 20 is formed, according to the principles of powder metallurgy, with an external frusto-conical surface 22, which, after final sintering of the section 20, is ground to present an accurate surface. The valve-seat-engaging portion 21 is also formed of a sintered hard carbide composition, but, in this instance, such hard carbide composition has a binder content of about 30% nickel, the remainder of the composition being titanium carbide with a minor proportion of columbium carbide and/or tantalum carbide. This composition has a density of 6.0 grams per cc., a hardness on the Rockwell A scale of 85.0, a modulus of rupture of 210,000 p. s. i., a modulus of elasticity of 47,000,000 p. s. i., and a coefficient of thermal expansion of $5.3 \times 10^{-6}$ in./in./° F. It has thermal conductivity of .0768 cal./° C./cm./sec. This valve-seat-engaging member 21 is formed, in accordance with the principles of powder metallurgy, to the approximate shape desired including an internal frusto-conical surface 23 of approximately the same slope as the frusto-conical surface 22 on the member 20. After final sintering, this surface 23 is ground to provide the same slope as the ground surface 22.

The members 20 and 21, formed as above described, are assembled in the relation shown in Fig. 3 with the frusto-conical surfaces 22 and 23 in mating engagement with each other, and the members are then heated to a temperature of 2000° to 3000° F. to cause the two members to become autogenously welded together. Such autogenous welding is facilitated by providing a thin shim of nickel of approximately .005 inch thickness. The heating to weld the parts together causes the nickel to become diffused in the materials on either side of the joint and, therefore, this is "autogenous welding" since the nickel is not considered an added metal. This thin film or coating of nickel may be applied, if desired, by coating the surfaces with a suspension of nickel powder or by plating the surfaces. Iron and cobalt are the equivalents of nickel, as the binder metal in the hard carbide compositions, and, also, as a coating between the frusto-conical engaging surfaces.

The composite structures described above present different physical characteristics at different portions of the structure. For instance, they provide greater hardness at the outer periphery with less ductility and greater resistance to deformation at high temperatures, and less hardness and greater ductility in the interior portions of the structure. Notwithstanding the fact that these structures are composite, in that they are made in sections, the sections are so firmly and homogeneously united by autogenous welding as to present a strong composite structure that does not have zones of weakness at the joints. This is due, not merely to the fact that the sections are united by autogenous welding, but also to the fact that the welding takes place at mating frusto-conical surfaces of adjacent sections, which enables one to get such close and intimate contact in assembling the sections that the autogenous welding forms a firm and uniform bond between the sections.

I am aware that the composite structure, and the method of making the same, described herein are susceptible of considerable variation without departing from the spirit of my invention and, therefore, I claim my invention broadly as indicated by the appended claim.

Having thus described my invention, what I claim as new and useful and desire to secure by United States Letters Patent, is:

A composite turbine disc comprising a central section of alloy steel characterized by its high ductility and high coefficient of thermal expansion and having a peripheral frusto-conical surface, an intermediate section of cemented hard carbide composition characterized by its low ductility, low coefficient of thermal expansion and low density and having an internal frusto-conical surface, mating with said peripheral surface of the central section, and an external frusto-conical surface, and an outer section of cemented hard carbide composition characterized by its lower ductility, lower coefficient of thermal expansion and lower density than said intermediate section and having an internal frusto-conical surface mating with said external surface of the intermediate section, said intermediate and outer sections each consisting essentially of a binder metal and titanium carbide, said sections being autogenously welded at said mating surfaces.

References Cited in the file of this patent

UNITED STATES PATENTS

| | | |
|---|---|---|
| 142,407 | Mullin | Sept. 2, 1873 |
| 1,817,680 | Pratt | Aug. 4, 1931 |
| 1,965,242 | Kelly | July 3, 1934 |
| 1,995,973 | Ericksson | Mar. 26, 1935 |
| 2,027,787 | Ridgway | Jan. 14, 1936 |
| 2,034,278 | Becket et al. | Mar. 17, 1936 |
| 2,101,970 | Wissler | Dec. 14, 1937 |
| 2,121,448 | Ritzau | June 21, 1938 |
| 2,231,427 | Larsh | Feb. 11, 1941 |
| 2,387,903 | Hensel | Oct. 30, 1945 |
| 2,525,258 | Fabrizo | Oct. 10, 1950 |
| 2,575,808 | Halverson | Nov. 20, 1951 |
| 2,633,633 | Bogart | Apr. 17, 1953 |

OTHER REFERENCES

| | | |
|---|---|---|
| 538,654 | Great Britain | Aug. 12, 1941 |